July 9, 1963

C. M. COX 3,096,647

FLOW MEASURING SYSTEM

Filed Aug. 15, 1960

INVENTOR.
C. M. COX

BY Hudson & Young

ATTORNEYS

3,096,647
Patented July 9, 1963

3,096,647
FLOW MEASURING SYSTEM
Clyde M. Cox, Bartlesville, Okla., assignor to Phillips Petroleum Company, a corporation of Delaware
Filed Aug. 15, 1960, Ser. No. 49,471
1 Claim. (Cl. 73—228)

This invention relates to an improved flow control system. In one specific aspect it relates to a flow switch and a rate of flow measuring means integrated with a flow control valve wherein the valve closing mechanism is pivoted about a shaft.

Check valves and butterfly valves are examples of valves wherein the closing mechanism is pivoted about a shaft. Check valves have been employed to control the flow of fluids through pipelines. They are commonly employed to prevent the back flow of fluid when an upstream force causing the flow of fluid fails. A check valve is so constructed that upon failure of said force, the valve disc closes. While fluid is flowing to the valves, the disc is held in a position dependent upon the upstream force exerted upon the disc.

I have found that by integrating a metering mechanism and an adjustable flow switch with the rotating disc of a disc type valve, I can adjust the rate of fluid flow, record the rate of fluid flow, sound alarm signals, etc.

Accordingly, an object of my invention is to provide an improved flow control system.

Another object of my invention is to provide a valve having a pivoted closing mechanism with an integrated adjustable flow switch.

Another object of my invention is to provide a rate of flow indicator for a valve having a pivoted closing mechanism.

Other objects, advantages, and features of my invention will be readily apparent to those skilled in the art from the following description and appended claim.

Figure 1:
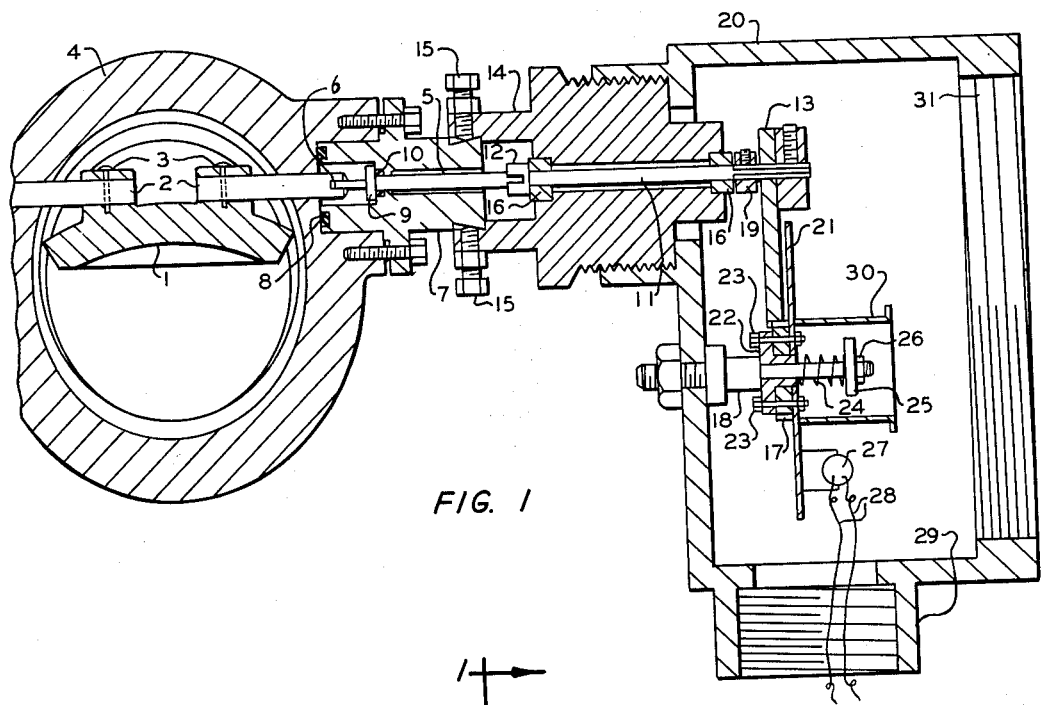
FIGURE 1 is a cross sectional view of the inventive flow control system taken along lines 1—1 of FIGURE 2.

Referring to the drawing and to FIGURE 1 in particular, a disc 1 is pivoted on a shaft 2. When employed as a check valve, the disc 1 is in the normally closed position until an upstream force is placed upon said disc. At this time the pivoted disc 1 imparts a rotating motion to shaft 2 and the disc 1 is held in its present open position. The valving mechanism is enclosed in a housing 4. Disc 1 is operatively attached to rotating shaft 2 by means of pin members 3. Rotating shaft 2 is operatively attached to a linking rotating shaft 5 by means of a screw driver joint 6, or other suitable means of directly transmitting the rotating motion of the shaft 2 to linking shaft 5. The linking shaft 5 extends through a housing outlet 7 provided with a sealing gasket 8. The linking shaft 5 is provided with a sealing gasket ring 10 and is positioned within said housing outlet 7 with the aid of a wear washer 9.

The purpose of the linking shaft 5 is to aid in the alignment of and the transmission of the rotating motion of the valve shaft 2 to a splined rotating shaft 11. It is within the scope of this invention to eliminate the linking shaft 5 and all attendant parts necessary for the operation of said shaft.

A rotating shaft 11 is operably attached to linking shaft 5 by means of a screw driver type joint 12. In this manner the rotating motion of the shaft 5 is directly imparted to the shaft 11. The opposite end of the shaft 11 is splined to hold a rotating gear 13 in fixed relationship with said shaft. The rotating shaft 11 is positioned within a threaded shaft housing 14, with said threaded shaft housing 14 operably attached to the valve housing outlet 7 by means of bolts 15. The rotating shaft 11 is held in fixed relationship to the shaft housing 14 with the aid of bearing surface rings 16.

Rotating gear 13 is a 120° fine-toothed gear operably engaged with a fine-toothed circular gear 17 rotating about a shaft 18. The 120° rotating gear 13 is positioned on the splined rotating shaft 11 by means of a spacer 19. The rotating gears 13 and 17 are enclosed within a housing 20 threadably engaged with said threaded shaft housing 14. An etched face plate 21, calibrated to read in terms of rate of fluid flow, is operably attached to the circular gear 17 and to a rotating spacing member 22 by means of bolts 23. A bolted assembly, comprising face plate 21, circular gear 17, and spacing member 22, is held in place on a shaft 18 by means of a spring 24, a washer 25, and a lock nut 26.

A tilting type switch 27, such as manufactured by Mercoid Corporation, Chicago, Ill., as illustrated in Catalog 600-A, is operably attached to the face plate 21. Lead wires 28 pass from switch 27 through a conduit outlet 29. A housing 20 is provided with a threaded opening 31 so that an inspection glass, or inspection plate, can be conveniently installed.

In the operation of the inventive flow control system the face plate 21 with the attached tilting type switch 27 is adjustably positioned so that a rotating motion imparted to the face plate 21, representing a rate of fluid flow, will operate switch 27 at a predetermined "set point" or rate of fluid flow. With the flow of fluid through the valve, or a cessation of fluid flow, the disc 1 will rotate, imparting the rotating motion to the shaft 2. Shafts 5 and 11 will also rotate in the same manner. The rotation of the shaft 11 will cause a gear 13 to rotate, and gear 13 will rotate gear 17 and the attached face plate 21. Thus, the position of the face plate 21 and switch 27 can be set so that the switch will operate for any position of the disc 1.

Figure 2:
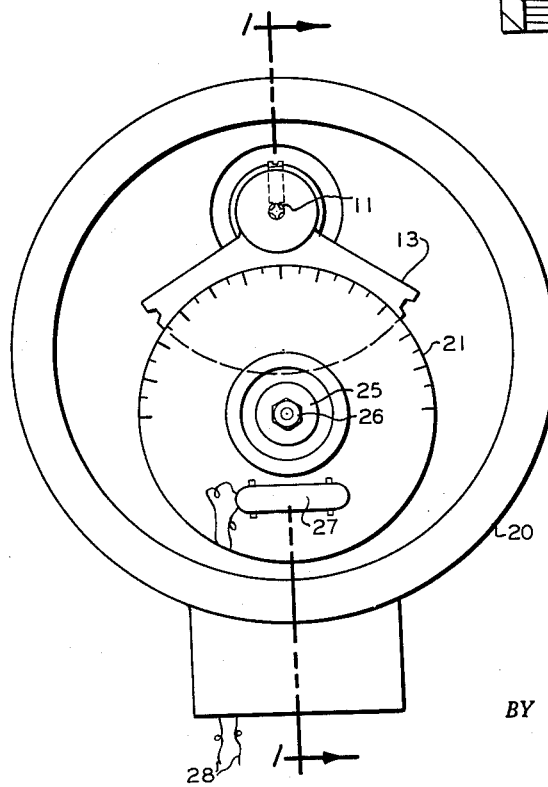
FIGURE 2 is a view of the flow control metering and switching mechanism of the inventive flow control system.

Any pivoted disc or clapper type valve can be adapted in the manufacture of the inventive flow control system. Although the invention has been preferentially described by reference to FIGURES 1 and 2 it is to be understood that it is within the scope of this invention to include variations of the inventive apparatus. Thus, in the simplest form, a metering dial can be attached directly to a single rotating shaft extending from the valve, with the rotation of the shaft representing the movement of the valve disc or clapper. An adjustable flow switch can also be operably attached to the single shaft.

As will be evidenced to those skilled in the art, other modifications of this invention can be made, or followed, in the light of the foregoing disclosure and discussion without departing from the spirit or scope thereof.

I claim:

A flow control system comprising, in combination: a valve having a disc and a first shaft means attached to said disc for pivoting said disc member within said valve, said disc member adapted to rotate about the axis of said first shaft means in response to the flow of fluid through said valve, said first shaft means extending without said valve; a second shaft means within a first housing means and operably attached at one end to said first shaft means by means of a screw driver joint; a third shaft means within a second housing means and operably attached at one end to said second shaft means by means of a screw driver joint, said first, second and third shaft means attached end to end so as to continue in the same alignment the rotating motion of said disc member attached to said first shaft means; a first gear member mounted on the extended portion of said third shaft means; a second gear member actuated by said first gear member, said second gear member being secured to a fourth shaft means, the axis of said fourth shaft means being parallel to the axis of said third shaft means; a rate of flow calibrated circular plate secured to said fourth shaft means so as to be rotated about said fourth shaft means in fixed relationship to said second gear member; and an adjustable tilting flow switch operably attached to said circular plate.

References Cited in the file of this patent

UNITED STATES PATENTS

| | | |
|---|---|---|
| 1,534,881 | Stokoe | Apr. 21, 1925 |
| 1,626,216 | Stratton | Apr. 26, 1927 |
| 1,712,761 | Furnival et al. | May 14, 1929 |
| 1,888,737 | Richmond | Nov. 22, 1932 |